US008141044B2

(12) United States Patent
Mann et al.

(10) Patent No.: US 8,141,044 B2
(45) Date of Patent: Mar. 20, 2012

(54) METHOD AND SYSTEM FOR IDENTIFYING SOURCES OF OPERATING SYSTEM JITTER

(75) Inventors: Vijay Mann, Haryana (IN); Pradipta De, Kolkata (IN); Ravi Kothari, New Delhi (IN); Rahul Garg, Ghaziabad (IN)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 11/939,913

(22) Filed: Nov. 14, 2007

(65) Prior Publication Data

US 2009/0122938 A1 May 14, 2009

(51) Int. Cl.
*G06F 9/44* (2006.01)
(52) U.S. Cl. ...................................................... 717/124
(58) Field of Classification Search ........................ None
See application file for complete search history.

(56) References Cited

U.S. PATENT DOCUMENTS

| 7,774,790 B1 * | 8/2010 | Jirman et al. ................. 719/318 |
| 2006/0132310 A1 * | 6/2006 | Cox et al. .................... 340/572.1 |
| 2007/0219941 A1 * | 9/2007 | Schnurr et al. ..................... 707/1 |
| 2008/0097991 A1 * | 4/2008 | Ishikawa .......................... 707/6 |

OTHER PUBLICATIONS

Gioiosa, R.; Petrini, F.; Davis, K.; Lebaillif-Delamare, F.; "Analysis of system overhead on parallel computers", Singal Proceedings of the Fourth IEEE International Symposium on Signal Processing and Information Technology ISSPIT, 2004.*

* cited by examiner

*Primary Examiner* — Philip Wang
(74) *Attorney, Agent, or Firm* — Gibb I.P. Law Firm, LLC; Derek S. Jennings

(57) ABSTRACT

A method for tuning performance of an operating system, the method comprising identifying all sources of operating system jitter; measuring the impact of each of the operating system jitter source; and tuning performance of the operating system, preferably by use of different approaches/techniques, which could include removing the sources of operating system jitter and/or delaying their execution and/or smoothening their execution over a longer period of time. Computer program code and systems are also provided.

21 Claims, 8 Drawing Sheets

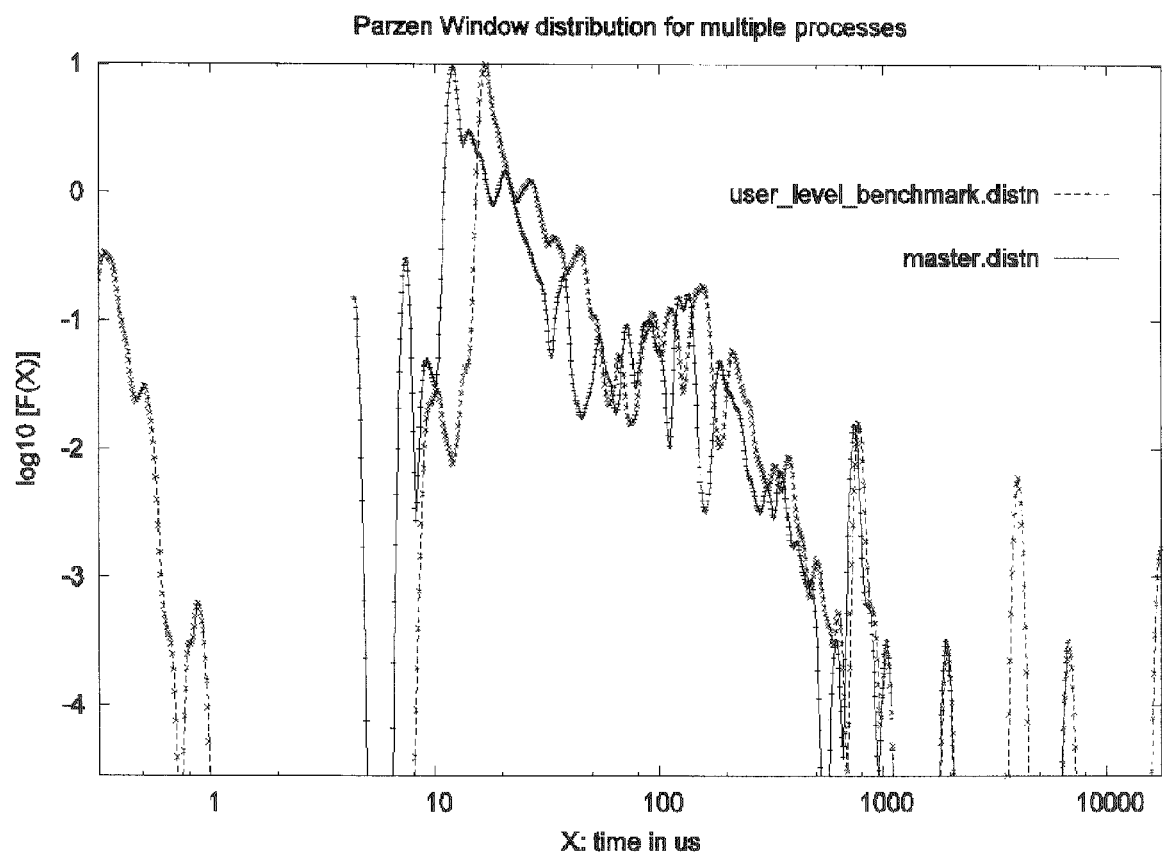
Figure 4 Comparing user level distribution with master distribution

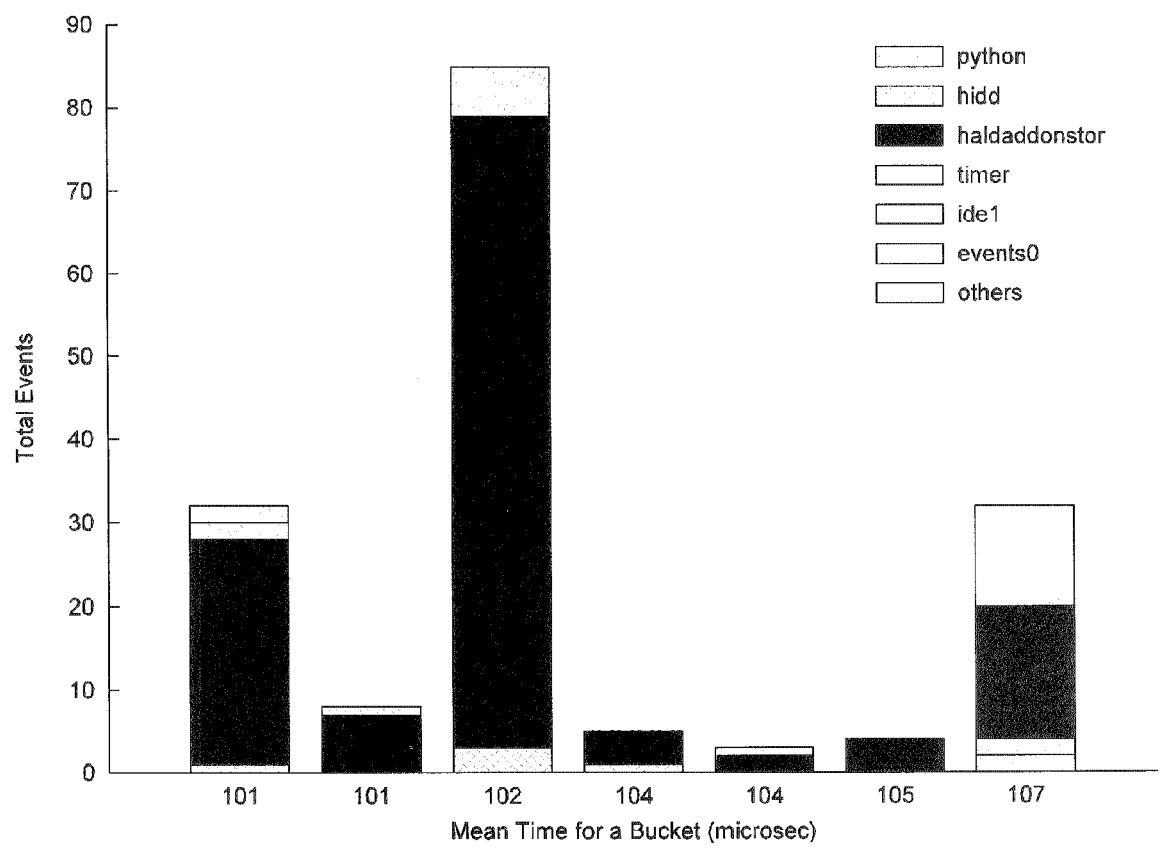
Figure 5 Identifying sources of OS Jitter in the range 100-110 microseconds

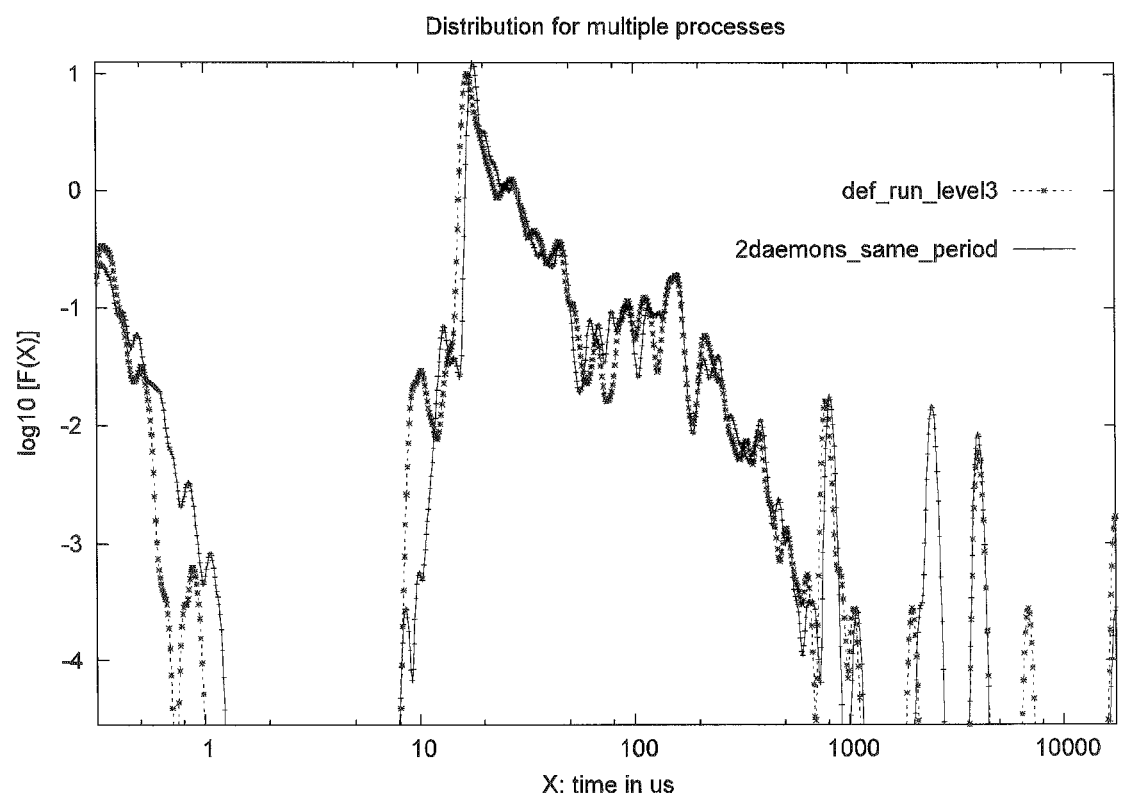
Figure 6 Detecting new sources of OS Jitter - default config and one with two new daemons – the new peak can be observed around 4500 us

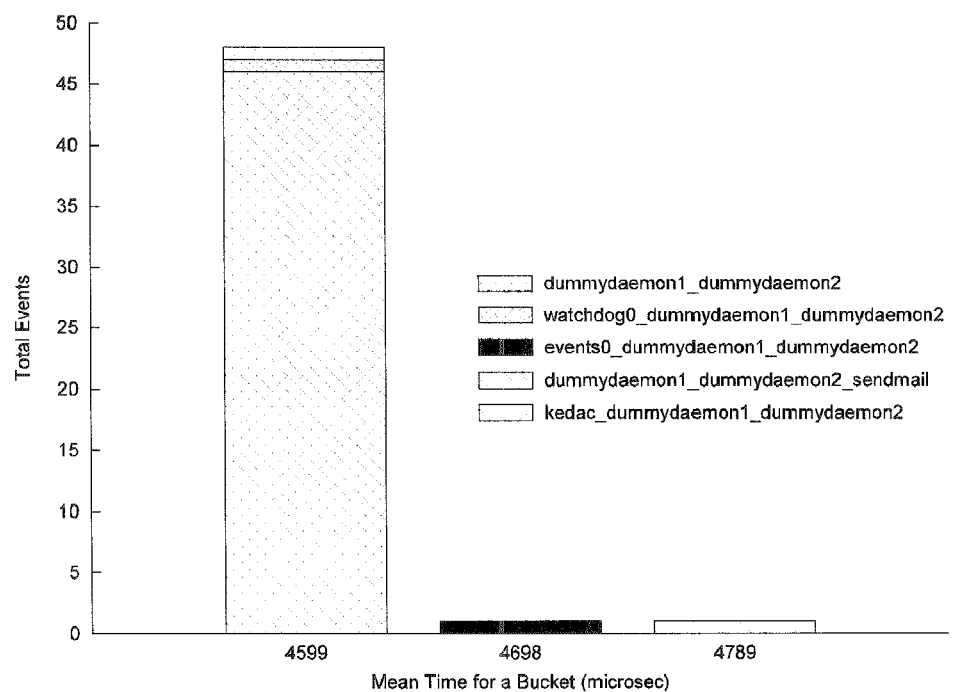
Figure 7 Portion of the master distribution in the 4500-5000 us range for the config with two new daemons (dummydaemon1 and dummydaemon2)

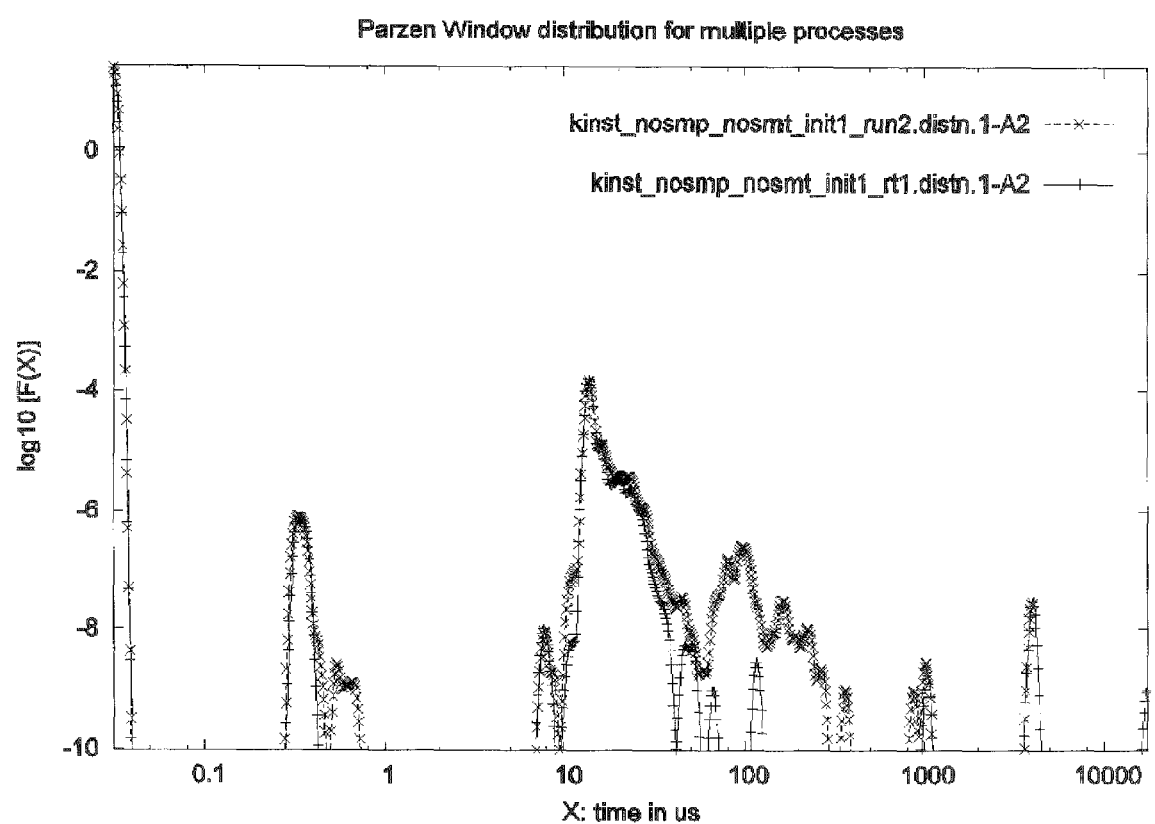
Figure 8 Effect of raised application priority: thin line with dashes indicates application running in real time priority 1 ; thick line with cross (x) is default priority

METHOD AND SYSTEM FOR IDENTIFYING SOURCES OF OPERATING SYSTEM JITTER

STATEMENT OF GOVERNMENT RIGHTS

This invention was made with Government support under Contract No.: HR0011-07-9-0002, awarded by the Defense Advanced Research Projects Agency (DARPA). The Government has certain rights in this invention.

TECHNICAL FIELD

The present invention relates generally to operating system jitter and, in particular to identifying sources causing such operating system jitter and measuring their impact.

BACKGROUND

Operating system interference, caused primarily due to scheduling of daemon processes, and handling of asynchronous events such as interrupts, constitutes "noise" or "jitter" (henceforth referred to as OS Jitter). OS Jitter has debilitating effects on large scale high performance computing (HPC). Traditionally, HPC systems have avoided OS Jitter by making use of specialized lightweight operating systems on computer nodes. However, this approach is not very useful as most applications written for commercial operating systems are rendered to be incompatible. For compatibility reasons, lightweight versions of commodity operating systems such as Linux™ have been created which can be used on compute nodes of large scale HPC systems. The creation of lightweight version of commodity operating systems requires a detailed study identifying the sources of OS Jitter and a quantitative measurement of their impact on these operating systems be carried out. To date, these studies of OS Jitter have proved are insufficient, as they have concentrated either on measuring overall OS Jitter experienced by an application or on estimating the effect of OS Jitter on the scaling of parallel applications and have not studied the issues of determining the biggest contributors to OS Jitter.

Apart from the known adverse effects of operating system clock ticks or timer interrupts there is little data available about system daemons and interrupts that contribute to OS Jitter. Furthermore, tuning an 'out of the box' commodity operating system is only the first step towards mitigating the effects of OS Jitter. In the absence of any quantitative information about the OS Jitter caused by various system daemons and interrupts, system administrators have to resort to their established knowledge and other ad-hoc methods to tune a system for HPC applications. This process not only requires highly knowledgeable system administrators, but is also error prone given the fact that new versions of these commodity operating systems get released at fairly regular intervals and new sources of OS Jitter get introduced in these releases.

Identification of all possible sources of OS Jitter and measurement of their impact on an application requires a detailed trace of the OS activity. Existing general purpose OS profiling tools, such as OProfile or the Linux kernel scheduler stats provide only a coarse measure in terms of time spent in each kernel function or process and do not uniquely measure the OS Jitter perceived by an application due to each OS Jitter source. Another tool for tracing events in Linux is the Linux Trace Toolkit (LTT) which, however, cannot record all interrupts and processes in a given time period without modification to the LTT.

Benchmarks developed specifically for studying OS Jitter such as the selfish detour benchmark, which can be used to measure OS Jitter on a wide range of platforms to study the effect on parallel program performance. Such benchmarks rely on the technique of sampling the timestamp register at a relatively high rate in a loop based on the fixed work quantum principle. However, these benchmarks do not provide any information about what daemons and interrupts contribute to OS Jitter and by how much.

OS noise has been studied in prior art ("System Noise, OS Clock Ticks, and Fine-grained Parallel Applications", D. Tsafrir, Y. Etsion, D. G. Feitelson, and S. Kirkpatrick, in Proceedings of *ICS*, 2005) and more specifically the impact of OS timer interrupts on parallel application performance. A methodology for determining the OS Jitter component was provided for by micro benchmarking the kernel through use of accurate timers. An in-kernel logging mechanism, called KLogger, was devised to trace fine-grain events. However, it could not identify all sources of OS Jitter and measure their impact or compare various configurations of a system to detect new sources of OS Jitter are introduced during software installation.

A need therefore exists for a tool that can identify the various sources of operating system jitter, measure their impact and provide a solution. A further need exists for a tool that can compare various configurations of a system to detect new sources of OS Jitter are introduced during software installation.

SUMMARY

A method for tuning performance of an operating system, the method comprising identifying all sources of operating system jitter; measuring the impact of each of the operating system jitter source; and tuning performance of the operating system, preferably by use of different approaches/techniques, which could include removing the sources of operating system jitter and/or delaying their execution and/or smoothening their execution over a longer period of time. Computer program code and systems are also provided.

BRIEF DESCRIPTION OF THE VIEWS OF THE DRAWINGS

Some aspects of one or more embodiments of the present invention will now be described with reference to the drawings, in which:

FIG. 4 shows a user-level distribution contrasted with a master distribution.

FIG. 5 shows an example of sources of OS Jitter in the range 100-110 microseconds.

FIG. 6 shows the effects of introducing synthetic daemons, wherein an additional peak around 4500 µs is observed.

FIG. 7 shows an example of a portion of the master distribution in the 4500-5000 µs range for the configuration including the synthetic daemons of FIG. 6.

FIG. 8 shows the effects of raised application priority.

DETAILED DESCRIPTION OF THE ILLUSTRATED EMBODIMENTS

Figure 1:
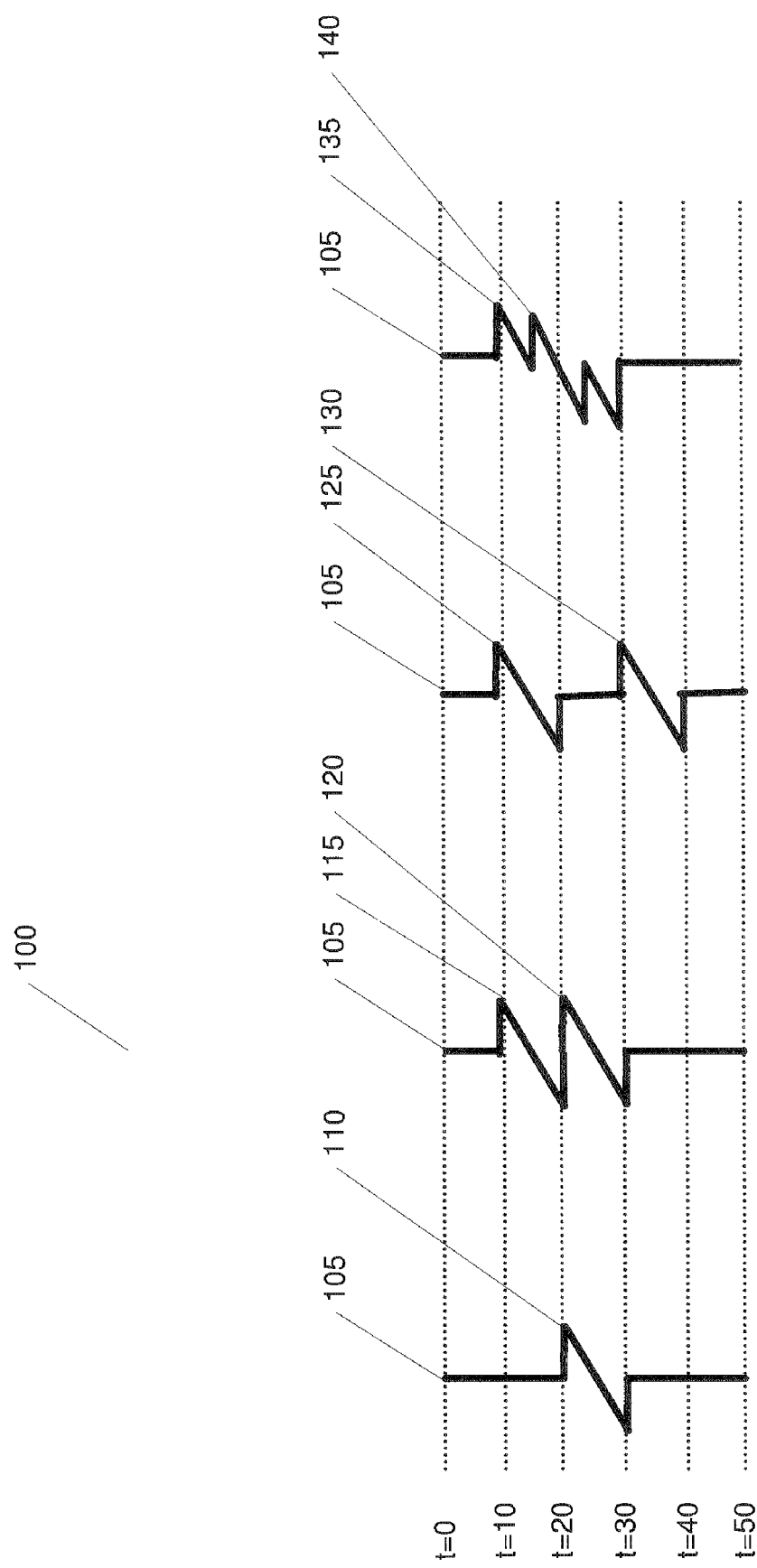
FIG. 1 shows various interruptions experienced by a software application.

Where reference is made in any one or more of the accompanying drawings to steps and/or features, which have the same reference numerals, those steps and/or features have for the purposes of this description the same function(s) or operation(s), unless the contrary intention appears.

FIG. 1 shows examples of OS Jitter experienced by a software application 100 recorded between a time interval, time t=0 seconds and t=50 seconds. OS Jitter arises out of scheduling of daemon processes, and handling of asynchronous events such as interrupts. An interruption experienced by an application can be due to any of the following:

a. A single daemon or interrupt occurs when the application is running 105 and takes a unique time every time it occurs; thereby causing a unique interruption 110 to the application every time;

b. A plurality of successive daemons or interrupts 115,120 occur when the application is running 105, causing an interruption to the application that is equal to the sum of the individual execution times;

c. A plurality of non-successive daemons or interrupts 125, 130 occur when the application is running 105, causing an interruption to the application that is equal to the sum of their individual execution times;

d. A plurality of nested interrupts 135,140 occur when the application is running 105, causing an interruption to the application that is equal to the sum of their individual execution times.

It should be apparent to a person skilled in the art that there could be various other ways to producing interruptions of applications and all such method and/or procedures should fall within the scope of the present invention.

Figure 2:
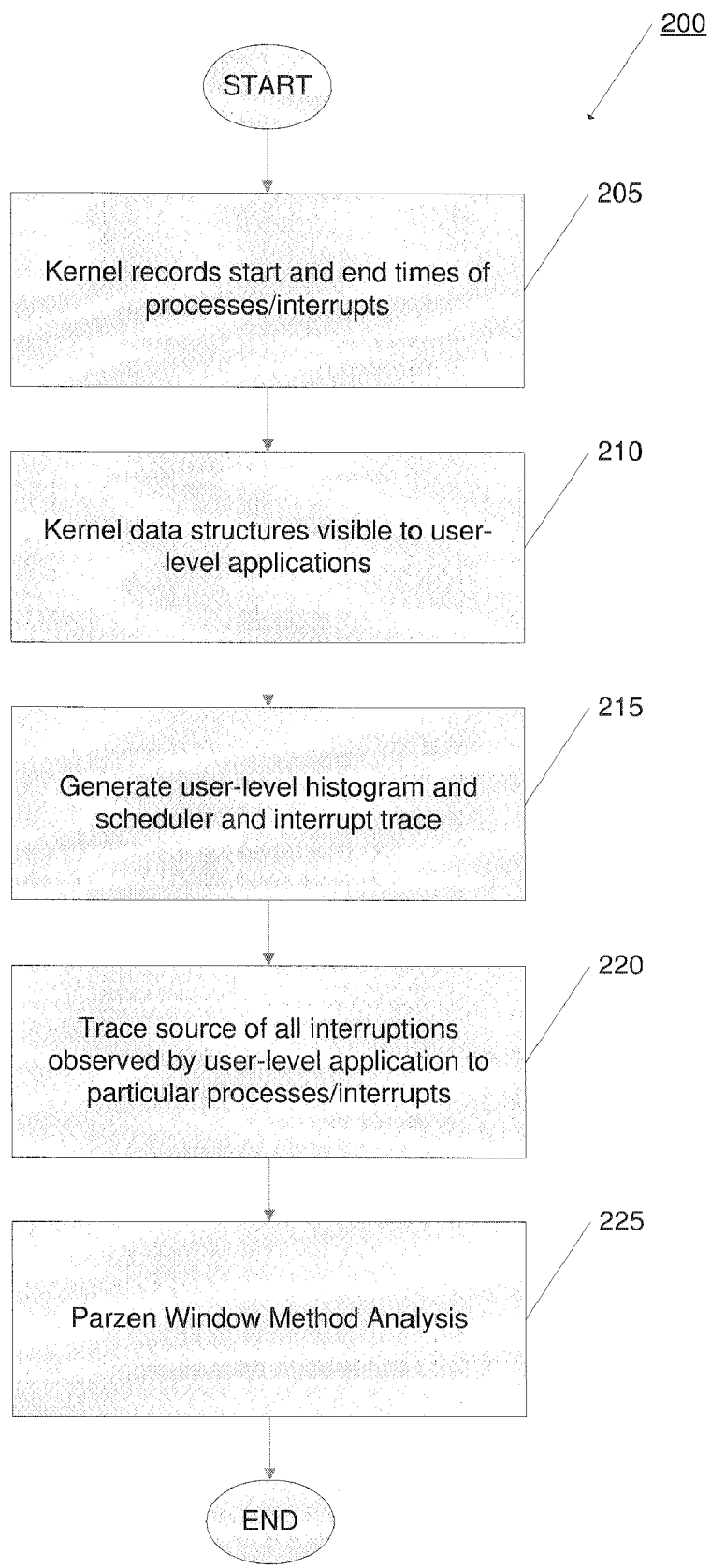
FIG. 2 shows a method 200 for identifying sources of OS Jitter and measuring the associated impact.

FIG. 2 shows a method 200 for identifying sources of OS Jitter and measuring their impact. In step 205, the kernel records the start and end times of all processes and interrupts in internal data structures. In step 210, the kernel data structures that record start and end times are made visible to user-level applications. In step 215 a user-level application is run that for example can follow the steps of:

a. Reads the CPU timestamp register in a tight loop (the critical section);

b. Calculates the difference between successive readings (timestamp deltas); and if the difference is greater than a threshold, add the timestamp delta to a histogram (henceforth referred to as the user-level histogram);

c. Reads the kernel data structures to determine the processes and interrupts that occurred and the duration during the execution of the critical section and prints the respective timeseries data (henceforth referred to as scheduler and interrupt trace) along with the user-level histogram to files;

In step 220, the user-level histogram and the scheduler and interrupt trace data are analyzed, and a trace of the source of all the interruptions observed by the user-level application to a particular process or an interrupt or a combination of processes and interrupts is determined. In step 225 the master and user-level histograms are analyzed to determine the sources of OS Jitter and the associated impact.

Figure 3:
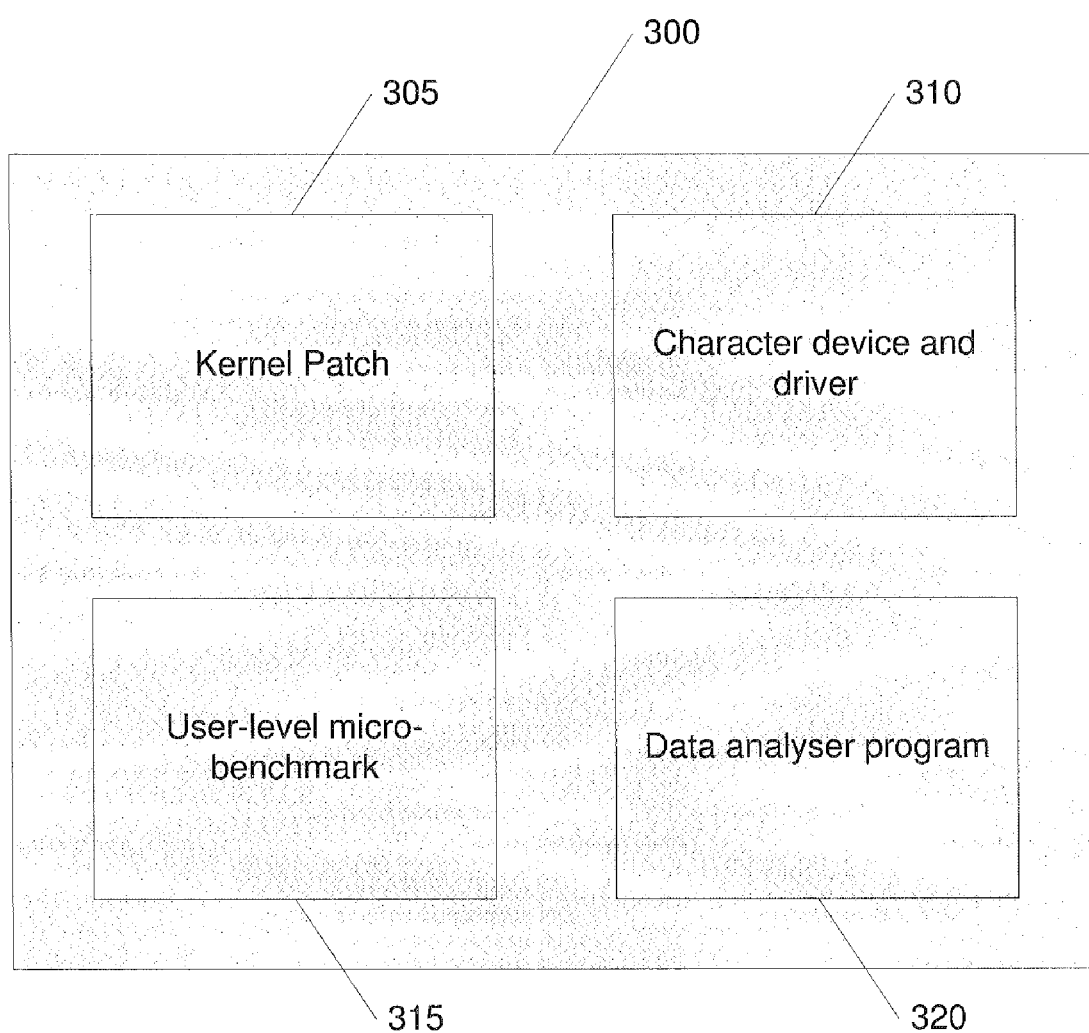
FIG. 3 shows a system for identifying sources of OS Jitter and measuring their impact.

FIG. 3 shows the system 300 that is configured to advantageously to implement the method 200. It should be apparent to a person skilled in the art that the system 300 is one possible interpretation, and there could be various other interpretations which fall within the scope of the present invention. The system 300 contains a kernel patch 305. The kernel patch is used to execute step 205 of method 200. The kernel is instrumented (the schedule function and the do interrupt request (IRQ) interrupt handling function to record the time stamps for the start time and end time of each process and interrupt, along with their names. The kernel records these timestamps in an internal data structure. These internal data structures along with the timestamps are stored in an array of fixed length. A pointer points to the current valid index in the array, where the next entry is to be recorded. The kernel instrumentation changes are packaged as a patch.

System 300 includes a character device and its associated driver 310. The kernel module 310 is used to execute step 210 of method 200. Once the kernel has started recording the scheduler and interrupt handling data these kernel data structures are accessed from the user-level application in a way that has minimal overhead. Preferably, a device driver whose memory is mapped to the kernel data structures is used or, alternatively, the kernel data can be exposed through the proc file system. A character device is created. The device driver for the character device is implemented as a kernel module. The device driver maps the device memory (which consists of the kernel data structures) to user-level in its mmap function call. Any user application is abler to open the device file and call mmap on it, like any normal file. The resulting memory pointer now maps to the kernel data structures.

System 300 further contains a user-level micro-benchmark 315. The micro-benchmark 315 is used to execute step 215 of method 200. The micro-benchmark 315 is based on the fixed work quantum principle. The pseudo code for the benchmark 315 is given in algorithm as follows in three steps:

```
STEP 1
iptr=mmap(interrupt_device_file);
sptr=mmap(scheduler_device_file);
/* start of kernel-level tracing, iptr,sptr=>memory mapped pointers
interrupt and scheduler device driver files*/
start_scheduler_index = sptr->current index,
start_interrupt_index = iptr->current index;
for (i = 0 to N) do
ts[i] = rdtsc( ); /* critical section */
end for
STEP 2
end_scheduler_index = sptr->current index,
end_interrupt_index = iptr->current index;
for start_scheduler_index : end_scheduler_index do
read_and_print_to_file(start time, end time, process name);
end for
STEP 3
for start_interrupt_index : end_interrupt_index do
read_and_print_to_file(start time, end time, interrupt name);
end for
/* calculation of difference of successive samples – timestamp deltas*/
for i = 0 to N–1 do
ts[i] = (ts[i+1]–ts[i]);
end for
/* generation of user level histogram from the user-level delay data */
add_to_distribution (ts);
```

The micro-benchmark (simply referred to as benchmark or benchmark application) 315 executes an iteration of rounds, where each round consists of the following steps:

a. The current valid index for scheduler and interrupt trace arrays in the kernel is recorded using the memory mapped pointers to the open device files.

b. The CPU timestamp register is read (using the rdtsc instruction on Intel) in a tight loop (the critical section first for loop in algorithm described above in para [0025]) and recorded. Each loop performs a configurable number of iterations (N). The number of iterations can be determined from the amount of physical memory (RAM) available on the system. A large number of samples (more than the physical memory) collected results in a higher chance of encountering cache misses, TLB misses and page faults. For example, on a system with 1 GB main memory, 16 MB iterations will cause the entire physical memory to be utilized, because each data item is 64 bytes large, 16 MB*64=1 GB).

c. The current valid index for interrupt and scheduler arrays is read a second time. The contents of the two arrays in the kernel between the two readings of current valid index are then read. This data includes the names and start and end times of all the processes that were scheduled and the interrupts that occurred during the execution of the loop. This information is written to a scheduler trace file and an interrupt trace file.

d. The timestamp data generated in the loop is then processed, and the difference between successive readings is calculated. These deltas represent the number of cycles required to read the timestamp register. If the difference is greater than a threshold (one typical value would be 10 times the minimum difference observed) due to a process getting scheduled, or an interrupt being handled or any other system activity that takes the CPU away from the application, the timestamp delta is added to a histogram (referred to as the user-level histogram). Typically, 99% of these deltas would be very small and these correspond to the actual number of cycles required for the rdtsc instruction (which is roughly equal to 88 cycles on Intel Xeon–0.03 microseconds on a 2.8 GHz machine). However, when a daemon process is scheduled or an interrupt is handled or combinations of these two occur, the deltas are much higher. To reduce the variance in timestamp deltas and aid in the detection of the smallest interruptions accurately, the only instruction executed in the critical section is the rdtsc instruction (and the additional instructions that are part of the execution of the for loop). All other processing is done outside the critical section.

This point marks the completion of one round or cycle. The benchmark 315 performs a series of rounds, adding the timestamp deltas to the user-level histogram created in the previous round. The technique of splitting the execution in rounds or cycles makes it possible to run the benchmark for long durations to collect a large number of samples without being limited by memory size when storing samples. When the given time to run elapses, the accumulated user-level histogram data is written to a file. Approximately 75% of the time taken to complete a round is spent writing the data to file system and generation of the histogram. The actual sampling of the timestamp register accounts for only 25% of the execution time.

System 300 further contains a data analyser program 320. The data analyser program is used to execute step 220 of method 200. The micro-benchmark 315, upon completion, produces the following 3 output files:

a) a distribution file containing the user-level histogram;
b) a time series file containing scheduler trace data (process start and end times along with process names);
c) a time series file containing interrupt trace data (interrupt start and end times along with interrupt names);

A data analyser program reads the above 3 files to generate a merged trace file that contains the processes and interrupts from files b) and c) above that caused the user-level micro-benchmark to experience a delay, indicating:

a) The processes that were scheduled between any two occurrences/instances of the benchmark in the scheduler trace data; and
b) The interrupts that were handled when the benchmark was running, which are inferred from the scheduler trace data.

The merged trace file is then used to generate a master histogram which has the same bin range as the user-level histogram. During the generation of the master histogram, various statistics for each bin, for example, the contribution of each process or interrupt or their combination to that bin. Once generated, the master histogram should match the user-level histogram if all the interruptions experienced by the user level benchmark come from either the scheduling of a different process (a context switch) or an interrupt being handled. In practice, they will not match fully as trace data about cache misses, TLB misses and page faults is not collected.

In step 225 of method 200, a Parzen window method is advantageously used to generate probability distributions for master and user-level histograms and compare them to identify sources of OS Jitter and determine their impact. It should be obvious to a person skilled in the art that various other techniques may be employed to compare master and user-level histograms and all such techniques will fall within the scope of the present invention. As an example, the master distribution and the user level distribution for run level 3 on Linux (Fedora Core 6, kernel version: 2.6.17.7) are shown in FIG. 4. The 100-110 microseconds portion of the master distribution indicates that the haldaddonstor daemon is the biggest contributor of OS Jitter in this range. This is shown in FIG. 5. Preferably, the analyzer program 320 also has the ability to limit the generation of histograms to the top 10 contributors of OS Jitter experienced by the user-level micro-benchmark 315.

Preferably, the analyzer program 320 can operate in two modes:

a) Time domain mode, where timing information is retained of interrupts and processes that are scheduled in succession. These combinations are considered as unique OS Jitter sources and the relevant statistics are recorded.
b) Frequency domain mode in which no timing information is retained and relevant statistics are maintained about individual daemons and interrupts only (and not their combinations).

The master histogram is generated typically in the time domain mode.

The user-level or master histogram of a system configuration can be compared to a baseline histogram, for example, a histogram representing an optimally tuned system, to detect new sources of OS Jitter that have been introduced by the installation or upgrading of new software. The Parzen window method of kernel density estimation is used to plot and compare master histograms corresponding to various system configurations. For example, the effects of the introduction of two synthetic daemons are shown in FIG. 6, as indicated by the extra peak around the 4500 µs mark. Further, the portion of the master distribution in the 4500-5000 µs range given in FIG. 7, indicates that dummydaemon1_dummydaemon2 is contributing to the majority of the OS Jitter. Preferably, the analyzer program 320 concatenates all sources of OS Jitter that occur in succession with an underscore ("_"). It is then possible to infer that there are two daemons called dummydaemon1 and dummydaemon2 that predominantly occur in succession to contribute to OS Jitter in this range. In this particular case, this happens as the new two new synthetic daemons had the same periodicity and were started at the same time. This kind of detailed analysis about identification and behavior of sources of jitter can not be done with existing tools.

The user level histograms and master histograms can also be compared to find out the effect of increased application priorities. The user level application can be run in a given priority and the user level histogram or the master histogram generated from this run can be compared to the baseline histogram (when the application is run in default priority). FIG. 8 indicates benefits of real time priority (a thinner line with dash) over the default priority (thicker line with star). It should be apparent to a person skilled in the art that though the analysis is discussed using histograms, various other statistical techniques available in the art can be used to perform such a detailed analysis as discussed above, and such statistical techniques fall within the scope of the present invention.

In compliance with the patent statutes, fairly specific embodiments, including preferred embodiments, have been described. It is to be understood, however, that the patent protection sought is not to be limited to the specific embodiments shown and described. The protection sought is to be limited only by the following claims, which are to be afforded full scope, and to be appropriately interpreted in accordance with the doctrine of equivalents. It should be readily apparent that the improvements claimed herein provide more than predictable use of prior art elements according to their established functions.

We claim:

1. A method for tuning performance of an operating system implemented using a computing device, said computing device comprising a processor executing instructions to perform said method, said method comprising:
    recording, by said computing device, timing data including a start time central processing unit (CPU) timestamp and an end time CPU timestamp and corresponding names of processes and interrupts occurring in an operating system;
    providing, by said computing device, said timing data to at least one user-level application executing in said operating system;
    calculating, by said computing device, a difference in time between successively recorded datum of said timing data;
    adding, by said computing device, said difference in time between said successively recorded datum to a user-level histogram when said difference in time is greater that a predetermined value;
    generating, by said computing device, a scheduler and interrupt trace data file based on said processes and interrupts occurrence and duration during an execution of a critical section of said at least one user-level application;
    determining, by said computing device, at least one source of operating system interruption observed by said at least one user-level application based on analyzing said user-level histogram and said scheduler and interrupt trace data file;
    comparing said user-level histogram to a baseline histogram to detect operating system interruption sources;
    measuring impact of each of operating system interruption source;
    tuning performance of said operating system by performing one of:
        removing said sources of operating system interruption; and
        delaying execution of said sources of operating system interruption.

2. The computer-implemented method according to claim 1, said recording further comprises instrumenting a kernel with a scheduler function and a do interrupt request (IRQ) interrupt handling function to store scheduler data and interrupt handling data, respectively.

3. The computer-implemented method according to claim 1, said timing data being stored in a fixed length array.

4. The computer-implemented method according to claim 3, further comprising a pointer that points to a current valid index in said fixed length array where a subsequent new timing data entry may be recorded.

5. The computer-implemented method according to claim 1, further comprising mapping, by said computing device, a device driver memory to said timing data by said at least one user-level application.

6. The computer-implemented method according to claim 1, said generating said scheduler and said interrupt trace data file further comprises:
    generating, by said computing device, a scheduler time series file containing said start time CPU timestamp and said end time CPU timestamp corresponding to and including one scheduled process name; and
    generating, by said computing device, an interrupt time series file containing said start time CPU timestamp and said end time CPU timestamp corresponding to and including one interrupt process name.

7. The computer-implemented method according to claim 6, said determining said least one source of operating system interruption further comprising reading, by said computing device, said user-level histogram, and said scheduler time series file and said interrupt time series file to generate a merged trace data file containing at least one of said process and said interrupt from said scheduler time series file and said interrupt time series file that caused a delay during the execution of a critical section of said user-level software.

8. The computer-implemented method according to claim 7, said delay at least one of between processes scheduled between any two data points in said user-level histogram, and between interrupts handled when data point were being added to said user-level histogram.

9. The computer-implemented method according to claim 7, further comprising:
    generating, by said computer device, a master histogram from said merged trace data file, said master histogram further including trace data of cache misses, Translation Lookaside Buffer (TLB) misses and page faults.

10. The computer-implemented method according to claim 9, further comprising:
    generating, by said computing device, probability distributions by analyzing said user-level histogram to said master histogram.

11. The computer-implemented method according to claim 10, further comprising:
    identifying, by said computing device, sources of operating system interruption by comparing said user-level histogram to said master histogram.

12. The computer-implemented method according to claim 10, further comprising:
    identifying, by said computing device, an effect of increased application priority by said user-level application being run at a given priority while said user-level histogram and said master histogram are generated, and comparing said user-level histogram and said master histogram to a default priority baseline user-level histogram and a default priority baseline master histogram.

13. A method implemented using a computing device, said computing device comprising a processor executing instructions to perform said method, said method comprising:
    recording, by a computing device, timing data including a start time and an end time and corresponding names at least one of processes and interrupts occurring in an operating system;

providing, by said computing device, said timing data to at least one user-level application executing in said operating system;

calculating, by said computing device, a difference in time between successively recorded datum of said timing data;

adding, by said computing device, said difference in time between said successively recorded datum to a user-level histogram when said difference in time is greater that a predetermined value;

generating, by said computing device, a scheduler and interrupt trace data file based on said processes and interrupts occurrence and duration during an execution of a critical section of said at least one user-level application;

determining, by said computing device, at least one source of operating system interruption observed by said at least one user-level application during execution of a critical time, based on analyzing said user-level histogram and said scheduler and interrupt trace data file;

comparing said user-level histogram to a baseline histogram to detect operating system interruption sources;

measuring impact of each of operating system interruption source;

tuning performance of said operating system by performing one of:
  removing said sources of operating system interruption; and
  delaying execution of said sources of operating system interruption.

14. The computer-implemented method according to claim 13, said recording further comprises instrumenting a kernel with a scheduler function and a do interrupt request (IRQ) interrupt handling function to store scheduler data and interrupt handling data, respectively.

15. The computer-implemented method according to claim 13, said generating said scheduler and said interrupt trace data file further comprises:
  generating, by said computing device, a scheduler time series file containing said start time CPU timestamp and said end time CPU timestamp corresponding to and including one scheduled process name; and
  generating, by said computing device, an interrupt time series file containing said start time CPU timestamp and said end time CPU timestamp corresponding to and including one interrupt process name.

16. The computer-implemented method according to claim 15, said determining said least one source of operating system interruption further comprising reading, by said computing device, said user-level histogram, and said scheduler time series file and said interrupt time series file to generate a merged trace data file containing at least one of said process and said interrupt from said scheduler time series file and said interrupt time series file that caused a delay during the execution of a critical section of said user-level software.

17. The computer-implemented method according to claim 16, said delay at least one of between processes scheduled between any two data points in said user-level histogram, and between interrupts handled when data point were being added to said user-level histogram.

18. The computer-implemented method according to claim 16, further comprising:
  generating, by said computer device, a master histogram from said merged trace data file, said master histogram further including trace data of cache misses, Translation Lookaside Buffer (TLB) misses and page faults.

19. The computer-implemented method according to claim 18, further comprising:
  generating, by said computing device, probability distributions by analyzing said user-level histogram to said master histogram.

20. The computer-implemented method according to claim 19, further comprising:
  identifying, by said computing device, sources of operating system interruption by comparing said user-level histogram to said master histogram.

21. A non-transitory computer storage medium readable by a computer tangibly embodying a program of instructions executable by said computer for performing a method for tuning performance of an operating system, said method comprising:
  recording timing data including a start time central processing unit (CPU) timestamp and an end time CPU timestamp and corresponding names of processes and interrupts occurring in an operating system;
  providing said timing data to at least one user-level application executing in said operating system;
  calculating a difference in time between successively recorded datum of said timing data;
  adding said difference in time between said successively recorded datum to a user-level histogram when said difference in time is greater that a predetermined value;
  generating a scheduler and interrupt trace data file based on said processes and interrupts occurrence and duration during an execution of a critical section of said at least one user-level application;
  determining at least one source of operating system interruption observed by said at least one user-level application based on analyzing said user-level histogram and said scheduler and interrupt trace data file;
  comparing said user-level histogram to a baseline histogram to detect operating system interruption sources;
  measuring impact of each of operating system interruption source;
  tuning performance of said operating system by performing one of:
    removing said sources of operating system interruption; and
    delaying execution of said sources of operating system interruption.

* * * * *